Oct. 31, 1933.    B. M. SHORT    1,933,393
FENDER WELL CRADLE FOR SUPPORTING TIRES
Filed July 2, 1931    2 Sheets-Sheet 1
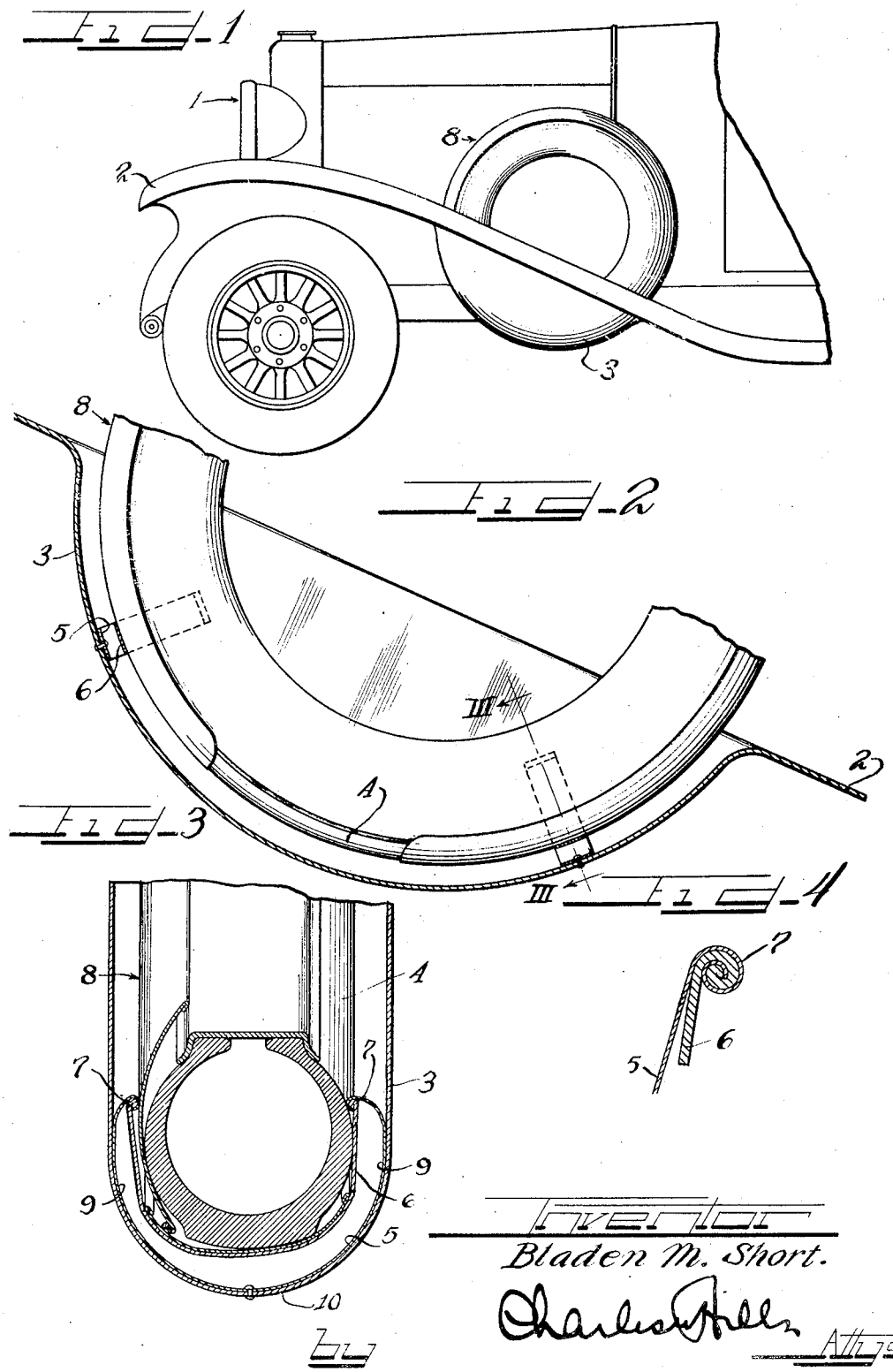

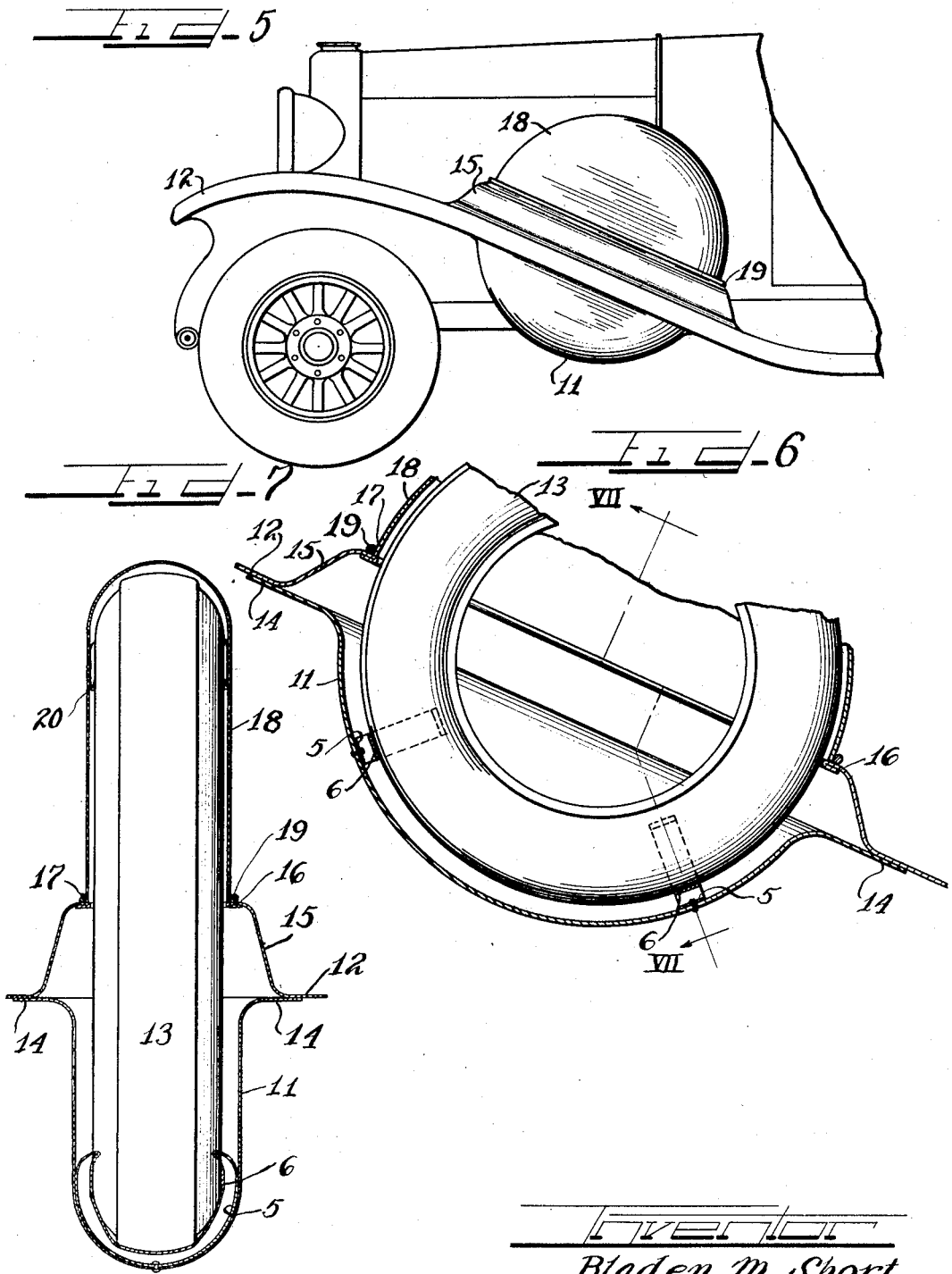

Patented Oct. 31, 1933

1,933,393

UNITED STATES PATENT OFFICE 1,933,393

FENDER WELL CRADLE FOR SUPPORTING TIRES

Bladen M. Short, Detroit, Mich., assignor to Lyon Cover Company, Detroit, Mich., a corporation of Michigan Application July 2, 1931. Serial No. 548,376

10 Claims. (Cl. 224—29)

This invention has to do with tire supports of the fender well type, and pertains particularly to a cradle construction combined with a fender well for this purpose.

In the usual fender well constructions, the tire is simply disposed in the well without any auxiliary means for suspending it other than the contour of the well itself, and since different makes of tires of the same nominal size vary considerably in cross section, there result, on occasion, disagreeable rattles and vibrations where the tires do not snugly fit in the well. Moreover, in the usual installation, a deflated tire, whether partially or completely, fits very loosely in the well, even though when inflated the tire may fit snugly therein.

It is accordingly one of the principal objects of the present invention to provide an improved fender well construction which, in supporting a tire, will aid in preventing all rattling regardless whether the tire be inflated or deflated and whether it would normally make a tight or a loose fit in an ordinary fender well construction.

Another object of the invention resides in the provision of an improved fender construction for cooperation with a fender well to house a tire, and combined with a cover for incasing the otherwise exposed parts of a tire carried by the fender well, the fender construction being such as to provide a substantially stream line effect from the fender proper to the tire cover, whereby the resistance due to a major portion of the tire projecting from the fender well will be very materially reduced.

In carrying out the invention, I secure one or more cradles to the bottom of the fender well in circumferentially spaced relation. Each cradle has substantially the outline of a quarter moon, the outer periphery of which conforms substantially to the contour of the well. The outer peripheral portion is resilient, and the inner peripheral portion is flexible and is adapted to directly receive the tire. The weight of the tire on the flexible portion will result in a more intimate contact between the outer peripheral portion and the fender well, and the cradles will prevent contact between the sides of the tire and the fender well. Thus in effect a floating support will be provided for the tire.

A stream line effect from the fender proper to the section of the tire, with or without a cover thereon, projecting from the well, is effected by forming a bulge in the fender adjacent the well and extending away from the well and inclined upwardly to meet the contour of the tire or its cover as a substantial tangential extension thereof.

Other and further important objects of this invention will be apparent from the disclosures in the specification and the accompanying drawings.

This invention (in a preferred form) is illustrated in the drawings and hereinafter more fully described.

On the drawings:

Figure 1 is a fragmentary elevational view of the forward portion of a motor vehicle, showing a tire provided with a tire cover and mounted in a fender well constructed in accordance with the present invention.

Figure 2 is an enlarged fragmentary sectional view through a fender well constructed in accordance with the present invention and a tire and tire cover carried thereby.

Figure 3 is an enlarged fragmentary sectional view taken approximately in the plane indicated by the line III—III in Figure 2.

Figure 4 is an enlarged fragmentary transverse sectional view showing a detail of the tire supporting cradle construction.

Figure 5 is a view similar to Figure 1 but showing a modified form of fender by which a stream line effect is obtained between the fender and a tire or a cover thereon projecting from a fender well.

Figure 6 is a fragmentary longitudinal sectional view of the fender and fender well construction depicted in Figure 5, the tire being shown in elevation.

Figure 7 is a fragmentary sectional view taken approximately in the plane indicated by the line VII—VII in Figure 6, the tire being shown in elevation.

Referring now more particularly to the drawings, wherein the same part is indicated throughout by the same reference character, a motor vehicle is indicated generally at 1 and includes among other things, a fender 2 having a fender well 3 for carrying a spare tire 4. The well 3 is shown in Figures 2 and 3 as forming an integral part of the fender 2, although it is to be understood that if desired, the fender well 3 may and often is formed as a separate part which is riveted or welded to a fender, the latter being provided with an opening corresponding with the opening in the fender well.

In order to properly support the tire, with or without a tire cover, in the well 3, special cradle construction is provided. In accordance with the present invention, the cradle construction has the contour substantially of a quarter moon whose outer peripheral portion 5 comprises a strap of resilient metal or the like and whose inner peripheral portion 6 may comprise any flexible material, such as fabric, thin metal, or even woven metal. The strap 6 is of course spaced from the strap 5, the latter having a form which substantially fits the interior wall of the fender well 3. The two straps are secured together by being wrapped, the outer strap 5 being wrapped about the inner strap 6 as shown at 7 in Figure 4. The connection 7 at each end of the cradle firmly unites the straps 5 and 6 thereof.

With the tire 4 disposed in the fender well and, provided with or in the absence of a cover 8, resting on the upper strap 6 of the cradle, the weight will cause the sides 9 of the outer strap 5 to be forced laterally into intimate contact with the walls of the fender well 3, and the flexible upper strap 6 will be in intimate contact with the tire cover. It will be appreciated that there is thus provided a substantially floating support for the tire by which the latter is spaced from the walls of the well 3 so that it is impossible for the tire to rattle in the well.

While any suitable means may be employed for securing the cradle to the well, the cradle is here disclosed as having its outer peripheral portion 5 riveted to the bottom 10 of the fender well. It will be understood, moreover, that in the absence of a tire cover, the flexible strap 6 will conform to the side walls and tread of the tire resting thereon. With this construction, it is clear that, in view of the fact that fender wells are normally made as wide as or wider than the largest sized tire to be used in connection with the particular vehicle by which the fender well is carried, this cradle construction is adapted for supporting any such tires and yet avoids rattling. The cradle construction is exceedingly simple, may be manufactured at a very low cost and readily connected to the fender well. While but two cradles are illustrated herein, it is to be understood that any desired number of cradles may be secured to the fender well.

It will be further appreciated that by virtue of the peculiar construction of the cradle, the pressure of the outer strap 5 against the wall of the fender well and the pressure of the upper flexible strap 6 against the tire supported thereby will increase with the weight of the tire, so that the anti-rattling effect of the cradle increases with the weight of the tire.

In the form of the invention shown in Figures 5, 6 and 7, the fender well 11 is not integral with the fender 12, but on the contrary is formed in a separate piece which may be riveted, welded or otherwise firmly secured to the fender 12. With this construction, cradles of the same character heretofore described are employed as shown in Figures 6 and 7, and each cradle comprises a preferably resilient metal outer strap 5 and a fabric or like inner strap 6, riveted at desired places to the well 11. A tire 13 rests on the cradle, the upper flexible strap 6 intimately engaging the tread and adjacent the side walls of the tire. In accordance with this form of the invention, the portion of the fender adjacent the flange 14 of the fender well 11 is bulged upwardly in the form of a long oval with its side walls 15 inclined toward the tire, and its upper marginal portion 16 substantially parallel with the adjacent portion of the fender body 12 to form a seat for receiving the margin 17 of a tire cover member 18. The cover 18, the oval portion 15, which is of a shape affording a stream line effect, and the fender well 11, together completely enclose the tire 13. The marginal portion 16 of the bulged part of the fender extends in substantially the same plane with a diameter of the tire, so that the cover member 18 serves to enclose substantially half of the tire 13. By this construction, the tire 13 may be inserted into the well through the opening defined by the marginal portion 16 without difficulty, and the cover member 18 can also be applied in position over the tire and in engagement with the marginal portion 16 without difficulty.

The cover member 18 may be secured detachably to the marginal portion 16 in any well known manner, and may likewise be locked to prevent theft of the tire. The cover member may be hinged to the marginal portion 16, or may be held thereto resiliently by means of a rubber or the like contact bead 19 or by hook devices such as are employed in holding an engine hood of a motor vehicle in engine covering position.

The inclined portion 15 of the bulged part of the fender 12 is so formed as to substantially merge with the body of the fender 12 and with the adjacent marginal portion 17 of the cover member 18, so that a stream line effect is provided and thus air resistance of the protruding tire and cover is substantially reduced.

From the foregoing it will be clear that I have provided a device of extremely simple construction yet most effective in preventing rattling of a tire in a fender well, and also an improved fender construction by which air resistance of the protruding tire carried in a fender well is materially reduced and the appearance of tires carried in fender wells substantially improved.

It will be understood further that motor vehicles employing fender wells for their spare tires quite universally include some locking means by which the tire is held rigidly against removal from the fender well. It is to be understood that such locking means, of whatever construction it may be, will necessarily cooperate with the anti-rattling means hereinabove described, the principles of the present invention being employed to prevent rattling of the tire in the fender well.

Inasmuch as, as heretofore mentioned, tires for the same size car or wheel vary in size within a certain range, it will be evident that the tires will not fit the cover member 18 exactly alike. Moreover, in view of the floating mounting provided by the cradles secured to the fender well, the tire may possibly rattle in the cover member 18. To avoid this, anti-rattling means is secured within the cover member 18, and while the anti-rattling means may take any desired form, it is preferred that such means be in the form of cradles of the character connected to the fender well. One such cradle is indicated at 20 in Figure 7. This cradle 20, or the desired number of such cradles, is preferably secured to the cover member 18 in much the same manner in which the cradles carried by the fender well 11 are secured. Each cradle 20 will be so fashioned as to engage with a certain amount of pressure the smallest size tire that may go into the fender well 11, so that, regardless of the size of the tire, once the cover member 18 is secured in closed position as shown in Figures 5, 6 and 7, the pressure of the cradle or cradles 20 prevents rattling of the tire in the cover member 18. A complete floating mounting, exerting lateral and radial pressure on the tire, is thus provided.

The strap 6 may or may not be elastic. In either event the depth of the strap 6 when depressed by a tire is preferably in excess of the radial distance between the widest portion of the tire and the outer periphery of its tread, so that the joint portions 7 project over said widest portion and thereby serve to retain the tire in the well or holder. Where a tire cover is mounted on the tire, one of the joints 7 will engage the side wall as shown in Figure 3.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. A yieldable support for tires and the like, comprising a cradle including a pair of flexible substantially U-shaped members, one of said members being substantially longer than the other, and said members being connected to each other at the ends thereof.

2. A cradle for yieldably supporting a spare tire or the like, comprising a substantially U-shaped resilient metal strap, a flexible strap of less length than the first mentioned strap and having its ends connected to the ends of the first mentioned strap, whereby said straps are spaced apart except at their ends, whereby, when a tire rests on the second strap, the first strap will be flexed and thereby provide a resilient support for the tire.

3. As an article of manufacture, a cradle for resiliently supporting a tire or the like, said cradle comprising a tire engaging flexible element, a relatively stiff resilient element, the ends of said elements being connected by spiral wrapping and said elements being otherwise spaced apart, whereby when the flexible element receives a tire or other object to be supported, the resultant weight causes relative movement of the ends of said resilient element, whereby the tire or other object is resiliently supported.

4. A spare tire mounting comprising a well for receiving a portion of a tire, and a cradle secured to the bottom of the well, said cradle comprising a flexible strap and a relatively stiff resilient strap connected together at their ends, means securing the resilient strap to the bottom wall of said well, the flexible strap being of less length than the resilient strap and supported by the latter, whereby, when a spare tire rests on the flexible strap, the latter will be flexed into intimate engagement with the tire and the ends of the resilient strap will be shifted, thereby causing the flexible strap to exert a resilient radial pressure on the tire.

5. A tire mounting and cover comprising a fender well for receiving a minor portion of a tire, a fender supporting said well, means carried by said fender and extending from the brink of the well with its upper margin located substantially in the plane of a diameter of a spare tire to be carried by the well, and a substantially semicircular casing for enclosing the protruding half of the tire to be carried by the well, said casing, when operatively related to said projecting portion, serving with said portion and said well to completely enclose the tire, said portion being inclined from the body of the fender to said casing to gracefully merge therewith, whereby a stream line effect is obtained.

6. A fender having an extended portion for receiving substantially half of a spare tire, a detachable casing part cooperating with said portion for enclosing the remaining half of the tire, the part of the fender adjacent said casing part merging gracefully with the fender and said casing part at obtuse angles to thereby provide a substantially stream line effect.

7. An anti-rattling support for a spare tire, comprising a well, a cradle secured to said well, said cradle comprising a resilient strap having free ends and nested within said well, a flexible strap of less extent than the first strap and bridging said free ends, said ends being normally spaced apart a distance in excess of the width of the spare tire, whereby positioning of the tire on the flexible strap will not be interfered with by said ends, the second strap being resiliently engaged by virtue of the weight of the tire and the resilient property of the first strap, with portions of the tire, whereby rattling of the tire in the well is prevented.

8. The combination with a receptacle in which a spare tire is adapted to be disposed of a flexible cradle transversely U-shaped for supporting said tire in said receptacle and a yieldable support between the receptacle and the arms of said cradle for causing said arms to converge toward each other by the weight of the tire inserted therein so as to cause said tire to be clampingly engaged thereby.

9. A yieldable U-shaped cradle for supporting a tire including side arms for engaging the side walls of the tire and a yieldable support for said arms to cause them to collapse toward each other by the weight of a tire inserted in the cradle whereby they can overhang said side walls to aid in holding the tire in the cradle.

10. The combination with an automobile fender well having a spare tire therein of a resilient cradle in the well for floatingly supporting the spare tire in the well said cradle being yieldably disposed in the well to establish a cushion between the tire and the bottom of the well and including a yieldable support responsive to the weight of a tire inserted in said cradle to cause the cradle to clasp side portions of the tire.

BLADEN M. SHORT.